July 3, 1956  A. E. R. ARNOT  2,753,066
INDUSTRIAL LIFT TRUCK WITH LATERALLY ADJUSTABLE FORKS
Filed May 12, 1953  3 Sheets-Sheet 1

INVENTOR
ALFRED ERWIN REGINALD ARNOT
BY Rowland V. Patrick
ATTORNEY

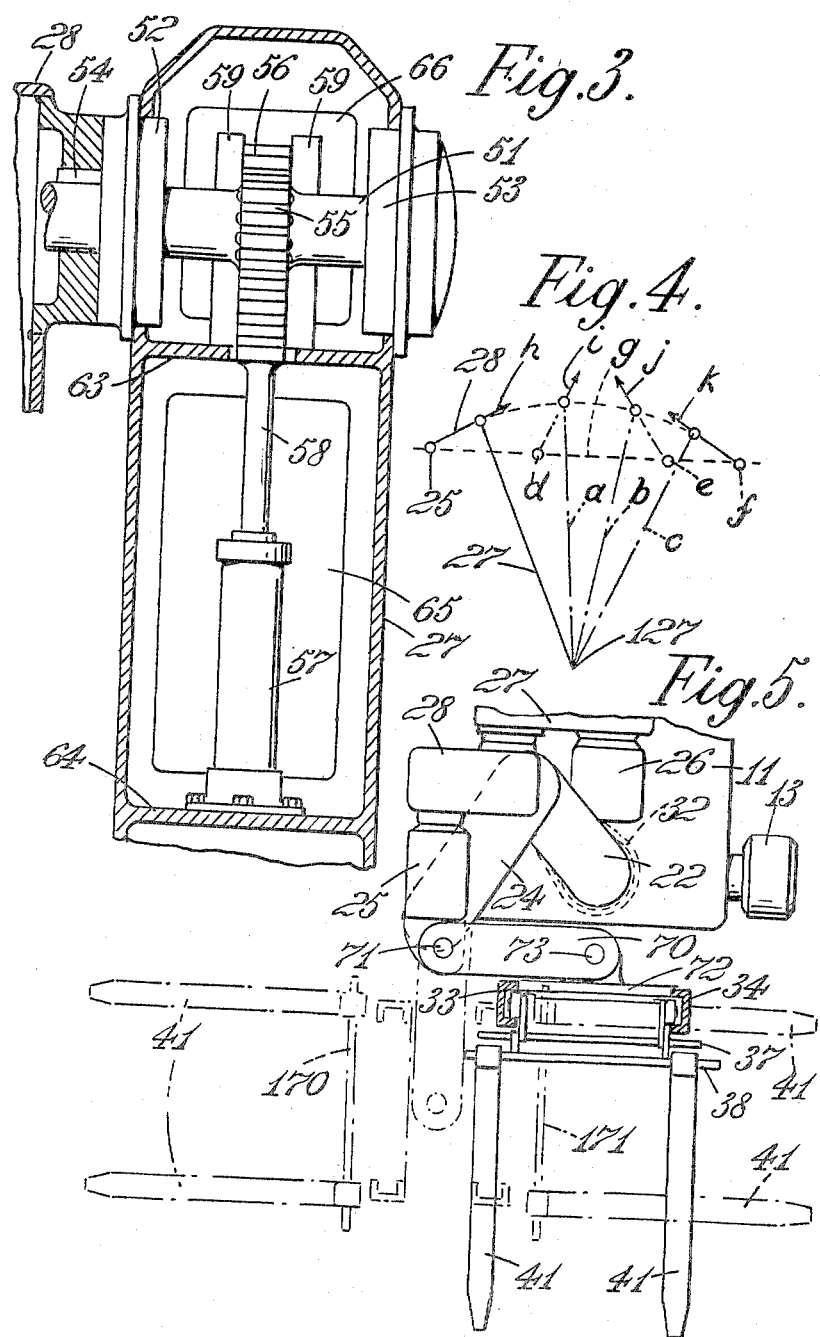

July 3, 1956
A. E. R. ARNOT
2,753,066
INDUSTRIAL LIFT TRUCK WITH LATERALLY ADJUSTABLE FORKS
Filed May 12, 1953
3 Sheets-Sheet 3
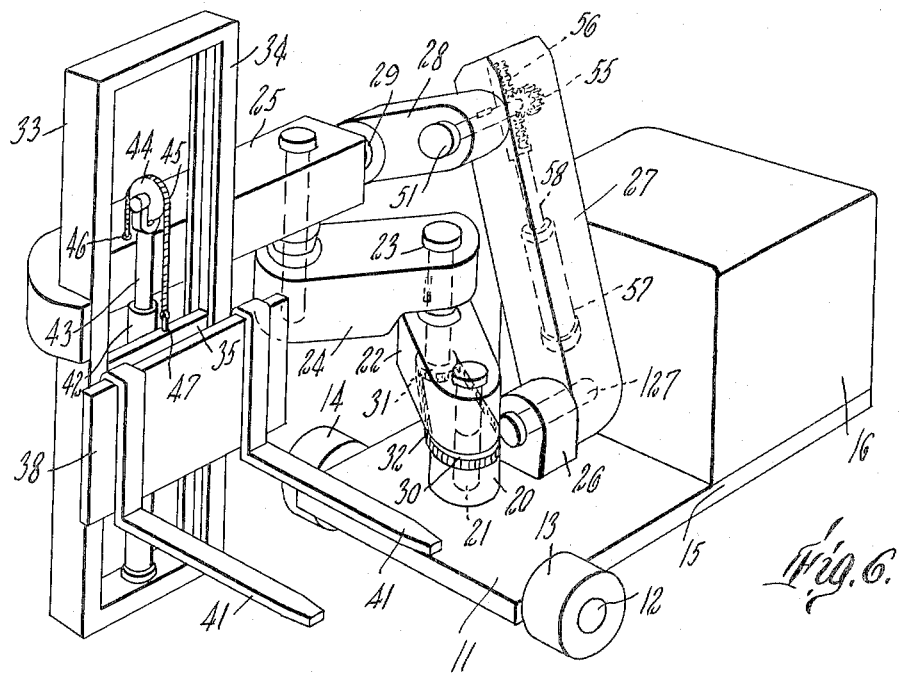
Fig. 6.
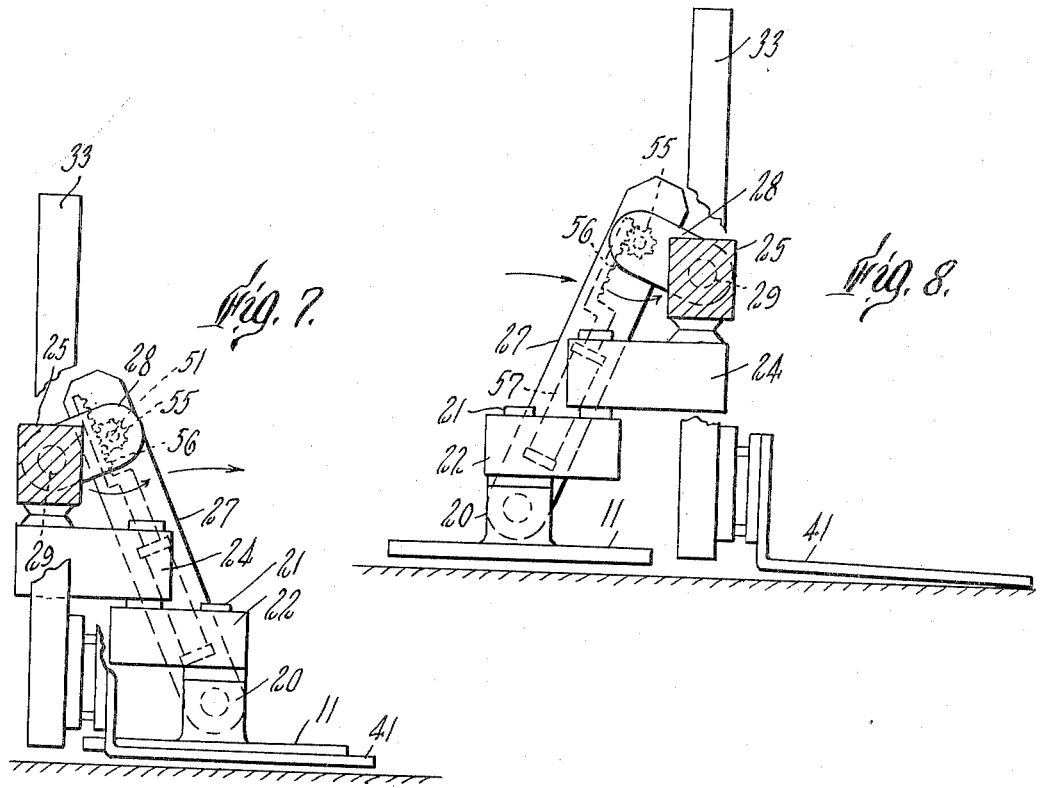
Fig. 7.
Fig. 8.

United States Patent Office 2,753,066
Patented July 3, 1956

2,753,066

INDUSTRIAL LIFT TRUCK WITH LATERALLY ADJUSTABLE FORKS

Alfred Erwin Reginald Arnot, Basingstoke, England, assignor to John Reginald Sharp and Emmanuel Kaye, Basingstoke, England Application May 12, 1953, Serial No. 354,620

Claims priority, application Great Britain May 15, 1952

10 Claims. (Cl. 214—671)

This invention comprises improvements in or relating to goods-handling trucks.

Goods-handling trucks according to this invention include pallet and other trucks having forks or other brackets to engage beneath and support pallets, stillages or the like or to support goods directly. Such trucks are often used for stacking goods in store and for removing them from the stacks, for which purpose not infrequently the forks or other brackets slide so that they can be elevated to reach the upper layers of goods which are stacked upon one another. In approaching goods in store the bracket portion of the truck has to be advanced into the stack of goods, for which purpose the truck is usually mounted on wheels and moved bodily towards the stack. After it has been withdrawn from the stack with the goods upon it, the truck has to be turned by steering it so as to move parallel to the stack and carry the goods away. This demands considerable space for manoeuvre, and the aisles which have to be left between the stacks of goods in storage have to be of considerable width which reduces considerably the storage capacity of the building in which the goods are kept. To reduce the width of the aisle it has been proposed to make the goods-carrying bracket movable transversely relatively to the truck so that the truck need not be steered into a stack of goods, but the constructions heretofore devised for this purpose involve considerable friction and difficulty of handling. It is an object of the present invention to provide an improved construction of side-stacking truck.

According to the present invention a goods-handling truck comprises a wheeled chassis and a goods-carrying bracket mounted thereon which is constrained to move transversely relatively to the chassis by being mounted on a floating carrier, which carrier is pivoted on a link, itself pivotally connected to the chassis or a member carried thereby so as to be transversely movable relatively thereto, the carrier being further constrained against angular movement relatively to the chassis by additional means connecting it thereto.

The first-mentioned link to which the carrier is pivoted may be carried on a second link pivoted to the chassis so that the carrier can move transversely to the chassis in a straight line.

In a preferred construction, the two links are pivoted on upright pivots to move horizontally, and the additional constraining means is connected to the chassis and carrier by horizontal pivots, to constrain the carrier in a vertical plane. Thus the movement of the carrier for the fork or like bracket is necessarily a horizontal movement in a straight line transverse to the centre-line of the chassis of the truck. The friction involved in sliding guides for the bracket is therefore obviated. This is particularly important because the bracket necessarily has to overhang the end of the truck relatively to which it moves sideways, and a sliding guide has to support considerable overhung weight, whereas the pivotally arranged guiding links according to the present invention can readily be made capable of carrying the overhung weight without undue friction.

The following is a description by way of example of a construction in accordance with the invention, reference being made to the accompanying drawing, in which:

Figure 3 is an enlarged view of the interior of a swinging link showing the mechanism for effecting transverse movement;

Figure 4 is a diagram of part of the mechanism;

Figure 5 is a plan of a modified fork mounting;

Fig. 6 is a perspective view of the truck of Figs. 1 and 2;

Fig. 7 is a diagrammatic front elevational view showing the linkages and their actuating means in the fork position of Figs. 2 and 6; and Fig. 8 is a diagrammatic front elevational view showing the linkages and their actuating means in a sideways extended fork position.

Figure 1:
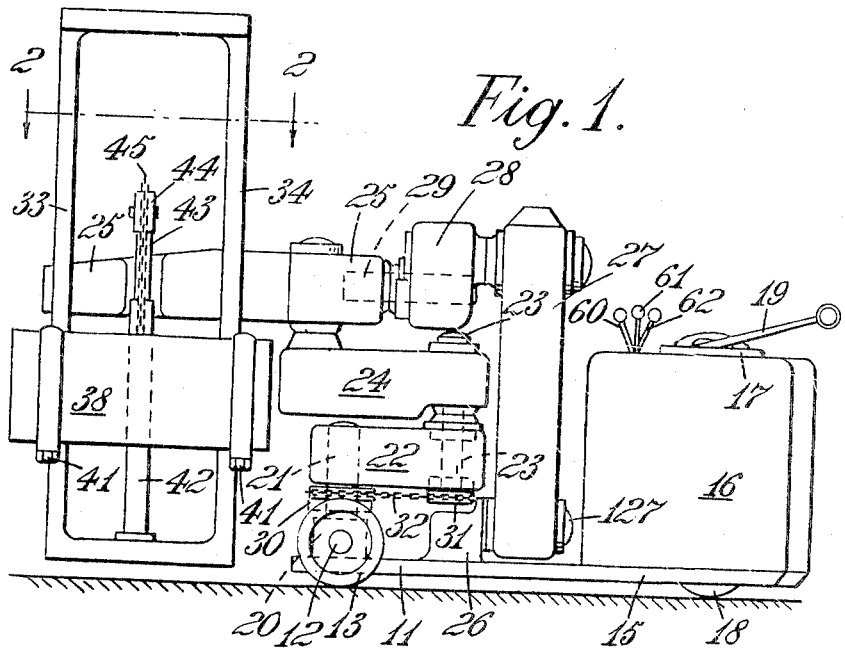
Figure 1 is a side elevation of the truck.

The truck comprises a chassis consisting of a low horizontal platform portion 11 in the front having a front axle 12 with two side wheels 13, 14 as close to the front edge of the platform as is practicable, and a rear portion 15 to the chassis which includes a casing 16 for driving mechanism and a turntable 17 on which a single driving wheel 18 is mounted. By rotating the turntable 17 by means of tiller 19 the chassis can be steered as well as propelled. The driving mechanism may include an electric motor and a storage battery within the casing 16. Alternatively it might be provided by means of an internal combustion engine as is well-known in fork trucks.

On the front of the platform 11 and approximately in the centre-line of the vehicle there is a strong base 20 for an upstanding pivot member 21. On this is mounted a horizontal swinging link 22 which itself carries another strong upstanding pivot 23 for a second horizontal link 24 pivoted at its free end to a floating carrier member 25. The effect is that the free end of the second link 24 and the carrier member are constrained to move in a horizontal plane, and in a straight line across the chassis to either side, provided that some constraint is provided to guide the free end of the carrier member 25 in the straight line referred to. To this end, on the platform behind the vertical upstanding pivot above referred to there is a block 26 which supports a rearwardly projecting horizontal pivot, and on the horizontal pivot there is mounted a long swinging lever 27. This lever extends upwards from its pivot to a point above the level of the carrier 25 where it carries a forwardly projecting horizontal pivot connected to the carrier 25 by a link 28. This link is pivoted to the carrier by a horizontal pivot 29, and all the pivotal connections are made rigid in the sense that they allow turning movement only, with no substantial slack in the bearings and a considerable stiffness of support for the pivots. The construction of the links 22, 24, 28, the lever 27 and the carrier 25 is of box-shape. They are conveniently fabricated by welding sheet metal sides together, which gives a very strong and stiff construction without undue weight.

As the link 28 and the carrier 25 are constrained by the swinging lever 27 to move in a vertical plane only, and the links 22, 24 constrain the carrier 25 to move in a horizontal plane only, the carrier must move along the line of intersection of the vertical and horizontal planes, that is in a straight line transversely across the truck.

Around the upstanding pivot 21 which is carried by the platform 11 is a stationary sprocket 30 which is coaxial with the pivot. The pivot 23 which is carried by the first link 22 is able to rotate freely in this link, but is keyed to the second link 24. This pivot projects below the first link and carries a sprocket 31, and the two sprockets are connected together by an endless chain 32. The sprocket 31 which is mounted on the pivoted end of the link 22 is made smaller than the fixed sprocket 30 supported by the platform, and the effect is that if the link 22 is swung about an arc, say in a clockwise direction as viewed in plan, the second link 24 will swing about the first in an anticlockwise direction at an angular velocity which is greater relatively to the first link than the angular velocity of the first link relatively to the platform. If the sizes of the sprockets 30, 32, are correctly adjusted, the end of the second link will not be constrained by the chain from moving in the straight line which is determined by the above described horizontal and vertical swinging links but the chain serves to prevent an indeterminate position of the linkwork which would otherwise arise when the parts come to a dead centre with the link 24 vertically above the link 22.

The horizontal carrier 25 projects forwardly from the truck in a direction parallel with its centre-line and carries vertical guides 33, 34 for a lifting cradle 35. The cradle 35 is of known construction having rollers 36 which run in the channel members 33, 34, and a front plate 37 to the upper edge of which is pivoted a tilting plate 38, which can be tilted relatively to the cradle 35 by short hydraulic jacks 39 having rams 40. On the plate 38 are fork-arms 41 for lifting goods.

Figure 2:
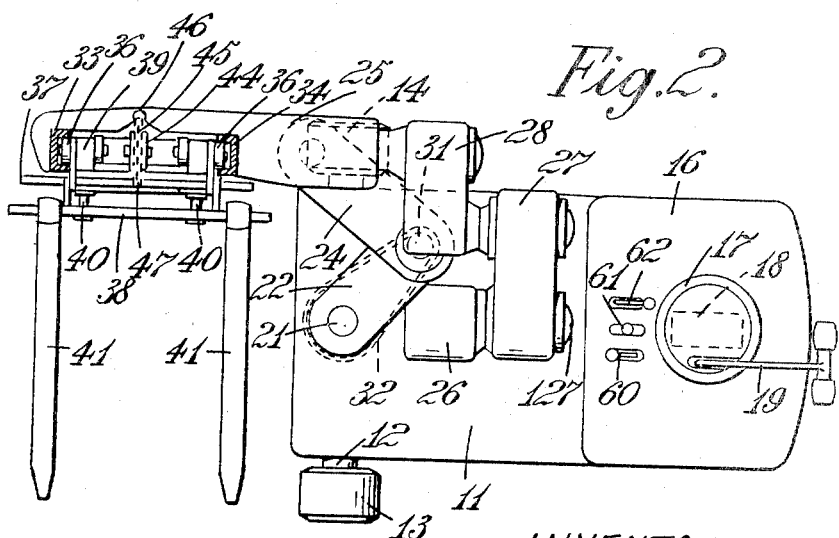
Figure 2 is a plan, partly in section upon the line 2—2 of Figure 1.

A hydraulic cylinder 42 has a ram 43 which carries a pulley 44 over which passes a chain 45. One end of the chain is anchored at 46 to the carrier arm 25 and the other end is secured at 47 to the cradle 35. By operation of the lifting cylinder 42 and ram 43 the cradle can be moved up and down the mast 33, 34. The construction of the tilting fork-arms is similar to that described in our co-pending patent application No. 354,619, and now Patent No. 2,738,087. The carrier 25 moves parallel to itself, that is that it does not swing with the link. The vertical guides 33, 34 for the cradle 35 and lifting fork 41, 42 are therefore maintained constantly facing the same way as they move across the truck. The fork arms 41, 42, project laterally relatively to the centre-line of the truck and if the linkwork is moved so that the guides are in line with one side of the truck as shown in Figure 2, the fork arms will project from the guides substantially across the whole track of the truck. If the linkwork is then swung towards the other side of the truck the fork arms will be projected laterally beneath any goods which may be stacked on the side of the truck toward which the linkwork is swinging. Thereafter the goods can be lifted by raising the cradle 35, the linkwork swung back again to bring the goods out of the stack into the aisle and the goods can then be transported without the truck having had to be moved or steered out of this straight course down the aisle. It therefore follows that an aisle which is no wider than is necessary for the passage of the truck is sufficient to allow complete manipulation of the goods out of the stack at one side of the aisle. The carrier 25 may be described as a floating carrier because it is constrained to move parallel to itself in a straight line merely by contact with two pivot members, without the use of any guides.

It is of course necessary to arrange motive power for moving the linkwork. Power is supplied to swing the linkwork by mounting a hydraulic cylinder 50 (Figure 3) inside the vertical transversely swinging lever 27. To this end the pivot 51 at the upper end of this lever is mounted in bearings 52, 53 in the fore-and-aft faces of the lever and is rigidly secured to the constraining link by a key 54. Inside the lever and fast upon the pivot 51 between the bearings 52, 53 is a pinion 55. Meshing with the pinion and extending in a direction parallel with the length of the lever 27 and inside it, is a rack 56, and the rack is operated by a hydraulic cylinder 57 and ram 58 located inside the lever. The rack 56 slides between guide bars 59 secured inside lever 27. By moving the ram 58 in one direction the lever will be swung in one direction, and by moving it in the other direction it (and with it of course the whole mechanism) will be swung in the opposite direction. The controls for these movements are mounted on the steering mechanism of the truck above the casing at the rear of the chassis and operated by lever 60. The raising and lowering of the cradle 35 is controlled by lever 61 and the tilting of the fork 41 is controlled by lever 63.

The box-like lever 27 is stiffened by internal cross-partitions 63, 64 and access to the parts is given by removable panels 65, 66 in the walls of the lever.

Referring to Figure 4 this shows diagrammatically a series of positions which the lever 27 and link 28 assume as the carrier 25 is moved across the machine from one side to the other. The lever 27 pivots about the pivot member 127 to a series of positions indicated at *ab* and *c* in the diagram, and as it does so the link 28 is moved across and moves angularly relatively to the lever so that the carrier 25 assumes corresponding positions *def* upon a straight line *g*. The arrows *hijk* are drawn in each position in line with the link 28 and it will be seen that they differ in angular relationship to the lever 27 by about 180° between the extremes of the lever movements. This indicates that the pinion 55 must be rotated through about 180° by the operation of the rack 56 and ram 58.

The mechanism as above described suffices for operating the truck in the normal way, and if it be required to stack or unstack goods from the opposite side of the aisle from that toward which the forks extend, this can be done by propelling the truck outside the end of the aisle and turning it round. In some cases, however, it may be convenient to be able to reverse the forks without necessarily turning the whole truck round. If this is desired, the floating carrier 25 instead of being rigidly connected to the guide-frame 33, 34 for the lifting fork it can be hinged thereto about a vertical axis, means being provided for locking the frame in the position in which the fork arms project towards one side of the truck, or alternatively for locking it in the direction in which the fork arms project forwardly. This will enable the truck to be used either for lateral movements or for the normal operations of the fork truck with the fork arms projecting forwardly. In the construction shown in Figure 5 the carrier 25 carries a link 70 the length of which is about half the width of the truck and which is pivoted to the carrier about a vertical pivot 71. The link 70 is of deep box-section for lightness combined with strength and rigidity and the end of the link is pivoted at 73 to a cross member 72 on the middle of the back of the vertical guide frame 33, 34, for the fork arms and suitable locking means are provided at the pivots 71, 73 to lock the link 70 rigidly to the carrier 25 either in the position shown in the full lines, Figure 5 or at one of the chain-line positions. The details of such a locking device may be any desired and are not shown in the drawing. If the link 70 is made to project from the carrier in the direction shown in full lines in the figure, the guide-frame can be arranged so as to carry the fork arms forwardly and symmetrically relatively to the truck. If the link 70 with the guide frame is swung through a right angle, the fork arms will project laterally to one side of the truck as shown in the chain lines 170. If, on the other hand, the link 70 is in the chain line position but the guide frame is swung round through 180° to the position of chain lines 171 the fork arms project toward the opposite side of the truck. The carrier, in either case, can be swung across the truck to advance the fork arms into a stack of goods at one side (or the other) of an aisle in a store. Thus, all possible positions can be provided for without turning the truck round.

It is of course possible with the construction shown in Figure 5 to arrange hydraulic controls to swing the link 70 and guide frame 72 into the required positions if the frequency of change warrants the additional cost.

I claim:
1. In a goods handling truck having a wheeled chassis and a goods carrier, link means for mounting said goods carrier on said chassis for movement in a straight line, said link means including a pair of links mounted respectively on said chassis and on said carrier for pivotal movement about vertical axes and having their free ends pivotally connected for swinging movement relatively to one another in a horizontal plane, and means limiting said carrier to movement in a straight line.

2. In a goods handling truck as claimed in claim 1, further including means for swinging said links relatively to one another.

3. In a goods handling truck as claimed in claim 1, further including means interconnecting said links to swing said links in opposite directions.

4. In a goods handling truck having a wheeled chassis and a goods carrier, link means for mounting said goods carrier on said chassis for movement in a straight line only, said link means including a first pair of links mounted respectively on said chassis and on said carrier for pivotal movement about parallel axes and having their free ends pivotally connected for swinging movement relatively to one another in a plane perpendicular to said axes, and a second pair of links mounted respectively on said chassis and on said carrier for pivotal movement about parallel axes and having their free ends pivotally connected for swinging movement relatively to one another in a plane perpendicular to said axes, the axes of said second pair of links being at an angle to the axes of said first pair of links.

5. In a goods handling truck as claimed in claim 4, further including rack and pinion means for swinging the links of one of said pairs of links relatively to one another, said means including a pinion mounted on one of said links and a rack mounted on the other of said links, and means actuating said rack to rotate said pinion with its link.

6. In a goods handling truck having a wheeled chassis and a goods carrier, link means for mounting said goods carrier on said chassis for lateral movement in a horizontal straight line only, said link means including a first pair of links pivotally mounted respectively on said chassis and on said carrier for pivotal movement about vertical axes and having their free ends pivotally connected for swinging movement relatively to one another in a horizontal plane, and a second pair of links pivotally mounted respectively on said chassis and on said carrier for pivotal movement about horizontal axes and having their free ends pivotally connected for swinging movement relatively to one another in a vertical plane.

7. In a goods handling truck having a wheeled chassis and a goods carrier, link means for mounting said goods carrier on said chassis for lateral movement in a horizontal straight line only, said link means including a first pair of links pivotally mounted respectively on said chassis and on said carrier for pivotal movement about vertical axes and having their free ends pivotally connected for swinging movement relatively to one another in a horizontal plane, and a second pair of links pivotally mounted respectively on said chassis and on said carrier for pivotal movement about horizontal axes and having their free ends pivotally connected for swinging movement relatively to one another in a vertical plane, and rack and pinion means for swinging the links of said second pair of links relatively to one another, said means including a pinion mounted on the pivot at the free end of one of said links, a cooperating rack mounted at the free end of the other of said links, and means for moving said rack to rotate said pinion and swing said links relatively to one another.

8. In a goods handling truck having a wheeled chassis and a goods carrier, link means for mounting said goods carrier on said chassis for lateral movement in a horizontal straight line only, said link means including a first pair of links pivotally mounted respectively on said chassis and on said carrier for pivotal movement about vertical axes and having their free ends pivotally connected for swinging movement relatively to one another in a horizontal plane, and a second pair of links pivotally mounted respectively on said chassis and on said carrier for pivotal movement about horizontal axes and having their free ends pivotally connected for swinging movement relatively to one another in a vertical plane, and means for swinging the links of said first pair of links relatively to one another, said means including a first sprocket mounted on the pivot on said chassis and a second sprocket mounted on the pivot at the free end of the link mounted on said carrier, and chain means connecting said sprockets whereby swinging movement of one of said links in one direction will swing the other of said links in the opposite direction.

9. In a goods handling truck having a wheeled chassis and a goods carrier, link means for mounting said goods carrier on said chassis for movement in a straight line, said link means including a pair of links mounted respectively on said chassis and on said carrier for pivotal movement about vertical axes and having their free ends pivotally connected for swinging movement relatively to one another in a horizontal plane, means interconnecting said links to swing said links in opposite directions relatively to one another, means limiting said carrier to movement in a straight line, and horizontally extending fork arms mounted on said carrier for pivotal movement about a generally upright axis.

10. In a goods handling truck as claimed in claim 9, in which said fork arms are mounted for vertical movement relative to said carrier.

References Cited in the file of this patent

UNITED STATES PATENTS

| | | |
|---|---|---|
| 1,457,639 | Straight | June 5, 1923 |
| 1,978,170 | Roesner | Oct. 23, 1934 |
| 2,298,196 | Cochran | Oct. 6, 1942 |
| 2,381,656 | Eksergian et al. | Aug. 7, 1945 |
| 2,469,321 | Wood | May 3, 1949 |
| 2,563,514 | Brosamer | Aug. 7, 1951 |
| 2,613,828 | Elliott et al. | Oct. 14, 1952 |
| 2,618,396 | Belt | Nov. 18, 1952 |
| 2,646,182 | Maas | July 21, 1953 |
| 2,663,443 | Schenkelberger | Dec. 22, 1953 |
| 2,699,879 | Bertram | Jan. 18, 1955 |
| 2,706,062 | Turner et al. | Apr. 12, 1955 |

FOREIGN PATENTS

| | | |
|---|---|---|
| 615,281 | Great Britain | Jan. 4, 1949 |
| 1,064,691 | France | Dec. 30, 1953 |